(12) United States Patent
Schirf

(10) Patent No.: US 6,211,810 B1
(45) Date of Patent: Apr. 3, 2001

(54) ADAPTIVE DWELL TIMING FOR RADAR TRACKING

(75) Inventor: Vincent E. Schirf, Sudbury, MA (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/416,857

(22) Filed: Oct. 12, 1999

Related U.S. Application Data

(60) Provisional application No. 60/106,364, filed on Oct. 30, 1998.

(51) Int. Cl.[7] .............................. G01S 13/42; G01S 13/72
(52) U.S. Cl. ............................ 342/36; 342/37; 342/90; 342/95; 342/108; 342/115; 342/140; 342/145
(58) Field of Search .................................. 342/36, 37, 38, 342/40, 30, 32, 33, 74, 75, 89, 90, 91, 92, 95, 96, 97, 108, 113, 115, 139, 140, 145, 146, 189

(56) References Cited

U.S. PATENT DOCUMENTS

| | | |
|---|---|---|
| 4,489,388 | 12/1984 | DeGroot et al. ..................... 364/517 |
| 4,593,286 | 6/1986 | Mathews et al. ..................... 343/7 A |
| 4,814,779 | 3/1989 | Levine ................................. 343/754 |
| 5,001,650 * | 3/1991 | Francis et al. ....................... 348/169 |
| 5,128,683 | 7/1992 | Freedman et al. ................... 342/158 |
| 5,712,785 | 1/1998 | Mok et al. ........................... 364/428 |
| 5,825,322 | 10/1998 | Capozoli ............................... 342/3.7 |

* cited by examiner

*Primary Examiner*—John B. Sotomayor
(74) *Attorney, Agent, or Firm*—Foley, Hoag & Eliot LLP

(57) ABSTRACT

In an air traffic control radar system, a processor is described for correlating primary target data received from a target with a target report and a target track, wherein the processor has a search acquisition time that is adapted to the distance of the target from the radar site. The search acquisition time is shorter for more distant targets. The processor can employ a shorter cycle time (time quantum) to establish a correlation between target data and target reports than would otherwise be possible with conventional fixed search acquisition times. The average total dwell time may be reduced while complying with the mandated maximum processing time for more difficult radar reports.

20 Claims, 10 Drawing Sheets

ADAPTIVE DWELL TIMING FOR RADAR TRACKING

CROSS-REFERENCE TO RELATED APPLICATIONS

This application claims the benefit of the U.S. Provisional Application No. 60/106,364 having a filing date of Oct. 30, 1998.

U.S. GOVERNMENT CONTRACT

The effort was conceived or first reduced to practice under a U.S. Government Contract, namely, Federal Aviation Administration Standard Terminal Automation Replacement System ("STARS") contract number DTFA01-96-D-03008.

BACKGROUND OF THE INVENTION

1. Field of the Invention

The present invention relates to air traffic control ("ATC") radar systems, and more particularly to a data processing system for an air traffic control radar system.

2. Description of Related Art

An example of air traffic control tracking algorithms currently in use is the Mode Select Beacon System Sensor (MODE-S). MODE-S combines target responses produced by a primary radar with the target responses produced by a secondary radar. The primary target responses depend upon a reflection of a radar pulse of short duration from, for example, an aircraft wherein the range of the aircraft is determined from the round-trip time of the radar pulse. The secondary target data rely upon a response from a transponder or beacon located in the aircraft upon interrogation of the aircraft by a transmitted radar pulse transmitted by the ground-based antenna. The transponder response may indicate range, bearing, altitude, and identity of such aircraft.

The radar antenna can be mechanically or electronically scanned and typically focuses the radar pulses in a fairly narrow angular beam. A system incorporating an electronically-scanned antenna is disclosed, for example, in U.S. Pat. No. 5,825,322. A transmitter controlled by data processing electronics typically controls the signal strength and the duration of the pulses emitted by the antenna. The antenna commonly also serves as a receiver for returning signals, which are received when the antenna points at a target, but may also include superimposed interference signals due to noise. Data processing electronics processes the received signals using known processing algorithms to extract, for example, the position, velocity, direction of motion, and the type of target.

Before describing the various functions performed by the radar system in greater detail, it will be useful to define some of the terminology to be used: "Target data" are data points supplied by a suitable output of the radar acquisition system (having a primary and/or secondary antenna) and commonly expressed in polar coordinates (r, Θ) which are most suited for display. A "target report" is an association of target data (r, Θ) with a specific object (target). A "target track" is a time-sequence of target reports that have a high probability of being correlated and may be visually displayed indicating a "course" of the target. "Correlation" is a process used to establish a connection between multiple target reports. "Search acquisition time" is the time required to scan a wedge-shaped area bounded by a predetermined arc and a predetermined distance from the radar site. A "search radius" is the radius of a circular area surrounding a target in which the target is expected to be located in a subsequent radar scan. "Process delay time" refers to the time required to organize and buffer incoming and outgoing data. The buffering process typically introduces "jitter" in the target data causing a time spread in the arrival time of the data at the STARS processor. The "Dwell delay" is defined as the sum of the "jitter" due to process delay of incoming data (see above) and the time needed for the radar to scan all potential targets within the search radius of a target being tracked.

Efforts to modernize air traffic computers, displays and computer software are being undertaken in the STARS program of the Federal Aviation Administration ("FAA"). The STARS processing system is subject to various regulatory and technical requirements. One aspect of the of the STARS system requirements relates to data processing times; that is, to satisfy STARS requirements, certain specified data processing tasks may not exceed certain predefined time intervals. These time intervals are specified by statistical measures requiring, for example, that 95% of the targets are properly identified and correlated with a target track within 1 second for radar scenarios with a mixture of primary and secondary received target data.

Systems processing target data must provide reliable results within the specified data processing time even under challenging conditions, such as garble, malfunction or a total failure of a secondary radar site. In such an event, a controller must be able to rely on information received from the primary radar which lacks the identity code of the target otherwise supplied by the airborne transponder or beacon. Beacon reports from airborne transponders may be garbled in high traffic areas (target bunching), making it difficult to compile a reliable target report and ultimately a target track. Targets most likely to be misidentified are those having a relatively high angular velocity relative to the antenna, such as targets moving at high speed and/or targets located close to the radar site. Also, target tracks crossing at a shallow angle may be subject to swapping of identities.

Currently, radar sites relying on primary antennas for target tracking use a fixed dwell time. The dwell time has to be long enough so that multiple target data within the search area can be considered before a decision is made on which target report to correlate with which target track. For example, a conventional radar tracking system may typically use a fixed dwell time of 450 ms and attempts to correlate target data with a target track every 150 ms, hereinafter to be referred to as a time "quantum." Using a fixed dwell time for all target ranges, for short- and long- range radars, and for radars with different antenna periods is a compromise, since the search acquisition time for a defined search radius depends on the distance of the target from the antenna, and the antenna period. For example, for a target with a high angular velocity (the angular velocity is defined as the component of the linear velocity of the target perpendicular to the radius connecting the target and the radar site, divided by the distance of the target from the radar site), the search acquisition time may be 0.5 second so that the fixed dwell time of 450 ms is insufficient. Conversely, a search acquisition time of only 50 ms may be sufficient for distant targets which can therefore be correlated with a target track within a much shorter time.

A radar processing system processing target data with a constant 450 ms dwell time for all situations therefore appears to be inefficient and makes it difficult to satisfy a mandated one second response time for processing, correlating and displaying STARS target data as target tracks in 95% of the acquired target samples under all conditions.

Thus, a need exists for data processing methods and systems that reliably correlates target data with a target report and a target track within a shorter time, while satisfying overall system requirements for data processing speed, without increasing the frequency of correlation errors or requiring replacement of conventional mechanically scanned antennas.

SUMMARY OF THE INVENTION

A radar system relying primarily on radar signals reflected from a target for correlating target data between different antenna scans has a processor which processes the received target data with a search acquisition time that is adapted to the distance of the target from the radar site. The radar system may be part of a conventional air traffic control ("ATC") radar system, such as the STARS ATC system.

According to one aspect of the invention, a radar system includes an antenna acquiring radar signals from a target, with the radar signals providing target data representing spatial coordinates of the target. A processor produces a target report corresponding to the target by correlating with the target during a search acquisition time one of the target data having coordinates within a predetermined range of the target. The search acquisition time for the target data having coordinates within the predetermined range is adjusted depending on the distance of the target from the radar site.

Embodiments of the invention may include one or more of the following features. The processor may also correlate the target report with a target track which can be displayed on a display. The search acquisition time depends on operating parameters of the radar system and may also depend on at least one of the velocity, acceleration and maneuvers of the target. The operating parameters may include a rotation period of the antenna and a beam width of a radar beam emitted by the antenna. At least one additional antenna may be provided to supply additional target data, with the additional target data supplied to and processed by the processor. The antenna or antennas may be connected to the processor via a gateway and communication links implemented as serial data links and/or LANs.

According to another aspect of the invention, a processor of a radar system for correlating target data with a target track includes input means which obtain target data of a radar target, and processing means which produce within a processing time period a target report corresponding to the target by correlating with the target one of the target data having coordinates within a predetermined range of the target. The processor further includes output means providing displayable signals correlated with the target report. The processing time period is determined according to at least one of the spatial coordinates of the target with respect to the radar site.

Embodiments of the invention may include one or more of the following features. The displayable signals may be displayed on a display monitor as a target track, wherein the target track represents a sequence of target reports that have a high probability of being correlated. Alternatively or in addition, the displayable signals may be stored in a memory for further processing and/or analysis. The target data received by the input means may include the target data from at least one primary antenna and at least one secondary antenna. The target report and/or the target track may be formed from an identification code of the secondary antenna, if the identification code of the secondary antenna is intelligible, and from the target data of the primary antenna and at least a portion of the target data of the secondary antenna, if the identification code of the secondary antenna cannot be extracted from the data.

Methods of radar tracking are also provided herein, including providing a radar acquisition system with at least one antenna, wherein the system produces target data from at least the target, determining a search acquisition time based on at least one of the coordinates of the target and a search range, and correlating during the search acquisition time target data obtained during successive scans of the antenna and located within the search range to form a target track.

Embodiments of the method of the invention may include one or more of the following features. Correlating target data may include executing a correlation process during a quantized time period, and repeating the correlation process for subsequent quantized time periods until the target data are correlated or a predetermined timer has expired. Correlating target data may also include assigning a probability for the target data of being representative of the target based on a motion characteristics of the target, which may include a velocity, acceleration and/or direction of movement of the target. The predetermined range of the target may be substantially independent of the distance of the target from the radar site, and the search acquisition time may therefore be shorter for targets that are more distant from the radar site.

In yet another aspect of the invention, a computer program, residing on a computer-readable medium, includes instructions for causing a computer to accept radar target data representing spatial coordinates of a target and acquired during successive scans of a radar antenna, and to select from a subsequent scan target data having coordinates within a predetermined range of the spatial coordinates of the target determined during a previous scan. The instructions further cause the computer to compute a search acquisition time based on the predetermined range, and to correlate during the search acquisition time the target data with a target track. The search acquisition time may be shorter for targets that are more distant from the radar antenna than for targets that are closer to the radar antenna.

Correlating the target data with a target track may include executing a correlation routine during a dwell delay time which includes the search acquisition time and a jitter, wherein the dwell delay time is subdivided into time quanta having a predetermined time duration.

Further features and advantages of the present invention will be apparent from the following description of preferred embodiments and from the claims.

DETAILED DESCRIPTION OF PREFERRED EMBODIMENTS

In one embodiment of the invention, the average time required to process target data and to correlate the target data with track data can be shortened by using a variable search acquisition time for more distant targets. With the shorter search acquisition time, cycle time (quantum) in the processor can also be decreased.

Figure 1:
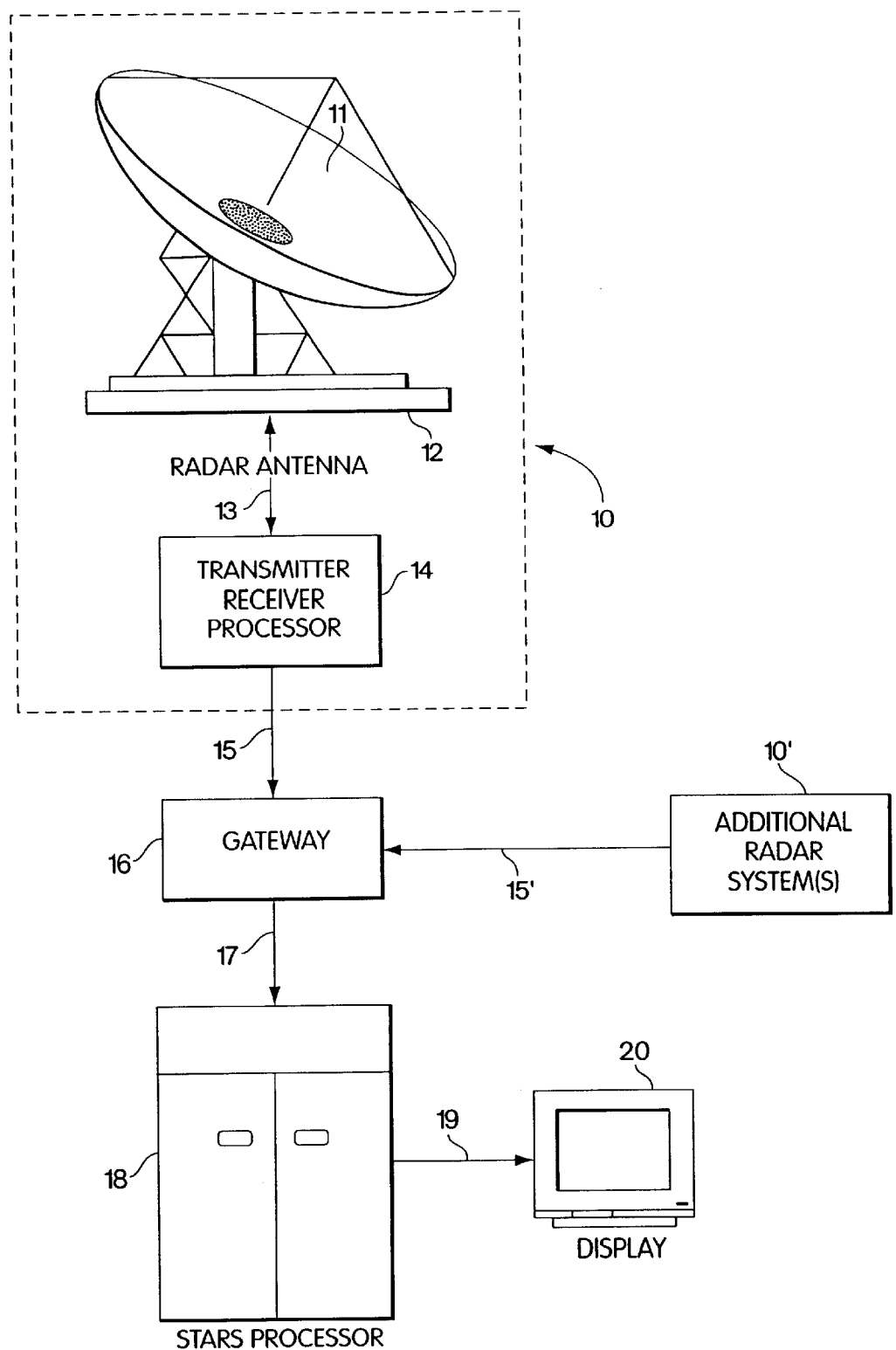
FIG. 1 is a schematic block diagram of a radar system.

Referring to FIG. 1, a conventional air traffic control radar system includes a radar acquisition system 10 with a primary and/or secondary radar antenna 11 mounted on a rotating mechanical pedestal 12. A transmitter portion of a transmitter/receiver/processor 14 (shown as a single unit) supplies target data via a link 13 to the antenna 11 for transmission. The transmitter/receiver/processor 14 may be a single unit or several cooperating units (not shown). The transmitter portion 14 is a conventional radar transmitter, comprising electronics and software. The signals from the transmitter portion 14 determine the nature of the interrogation signals sent by the antenna 11. The antenna 11 is also connected via the link 13 to a receiver portion of the transmitter/receiver/processor 14, comprising conventional electronics and software for receiving and relaying return signals received by the antenna 11. The pedestal 12 may support both the primary antenna 11 and a secondary antenna (not shown) which may be integrated in the primary antenna 11 and may transmit an interrogation signal to beacon- or transponder-equipped aircraft (not shown). The secondary antenna may be scanned mechanically or electronically, as mentioned above.

Typical primary target data are preferably in digital form and encoded in polar coordinates (r, Θ). The target data reflect the round trip time of the radar pulse between the antenna and the target and the azimuthal position of the target with respect to a reference direction, such as true North, and are transmitted via a link 15, such as a serial communication channel, to a common gateway 16. As indicated in FIG. 1, additional radar acquisition systems 10' including both primary and secondary antennas (only one additional system is shown in FIG. 1) may be connected to the gateway 16 via additional links 15', as is known in the art. The gateway 16 is connected via a link 17, which may be implemented as a LAN, to a STARS processor 18 which buffers and correlates the target data to produce target track reports. The correlated data are then transmitted via a link 19 which may also be a LAN, for display on a radar display 20 located, for example, at an ATC facility (not shown). Alternatively or in addition, the correlated data may also be stored in a memory (not shown).

A description of air traffic target algorithms with primary and secondary radar antennas is given in Federal Aviation Agency Specification No. FAA-E-2716, dated Feb. 27, 1990. Copies are available to the public through the National Technical Information Service, Springfield, Va. 22161. Specification No. FAA-E-2716 provides a description of a typical target data processing system and a description of the algorithms used for correlation of radar-beacon target reports. It should be understood that the processor 14 depicted in FIG. 1 is meant to include all processing electronics, hardware and software employed to accomplish conventional ATC target data processing.

Figure 2:
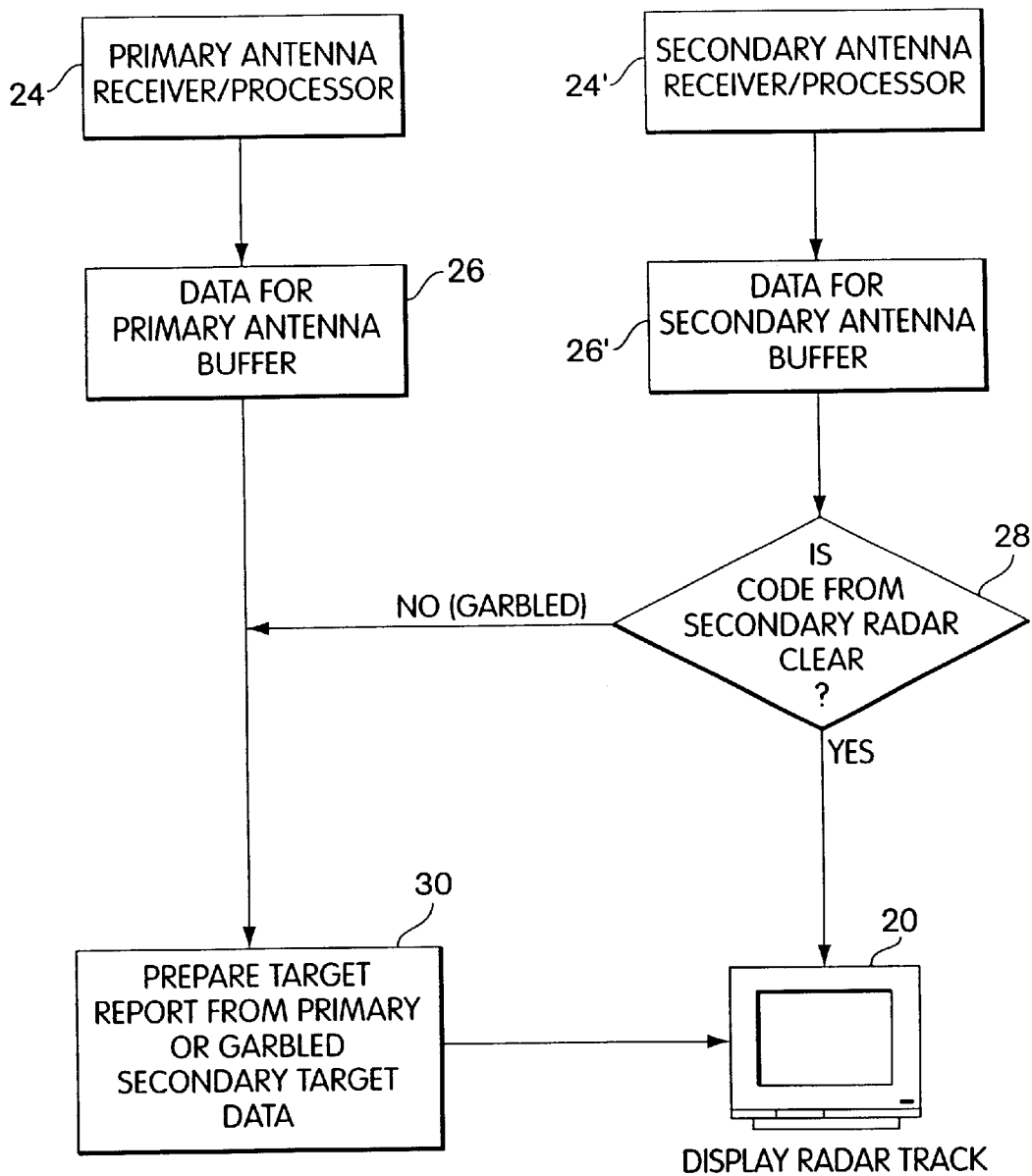
FIG. 2 is a data flow diagram of an air traffic control radar system incorporating primary and secondary antennas.

Referring now to FIG. 2, under normal operating conditions, target data are received by the primary antenna receiver/processor, step 24, and the secondary antenna receiver/processor, step 24', and transmitted to a primary antenna buffer, step 26, and a secondary antenna buffer, step 26', respectively. If the identification code can be extracted from the secondary radar data, step 28, then the data from the secondary radar can be unambiguously correlated with a target track and displayed on a display 20 or stored in a memory (not shown), as the case may be, without relying on the primary radar data. Conversely, if the identification code of the secondary target data contains errors so that the data cannot be reliably analyzed, then an attempt will be made to extract as much useful information from the secondary target data as possible so as to correlate the secondary target data with the existing radar tracks, thereby enhancing the reliability of the target report prepared from the primary target data, step 30.

Figure 3:
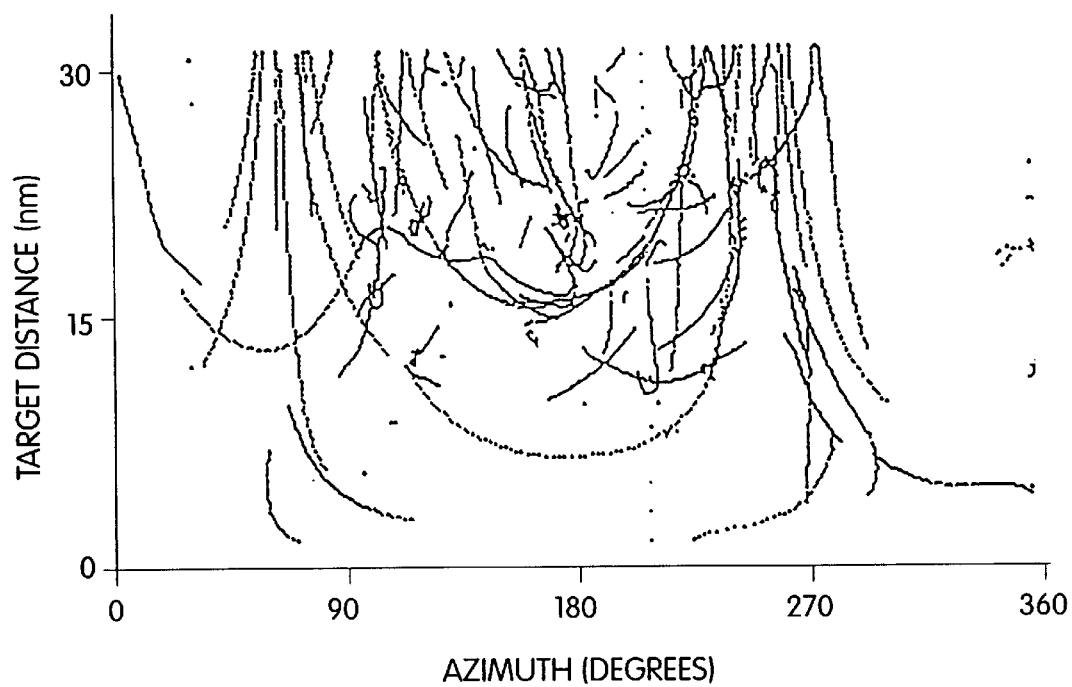
FIG. 3 shows beacon reports of an exemplary secondary short range radar system.

Referring now to FIG. 3, target tracks based on beacon reports received from the aircrafts' transponders by an exemplary secondary radar antenna of the Boston Short Range radar system are shown for 94 consecutive scans with a scan duration of 4.6 seconds, corresponding to a total scan time of 7.2 minutes. The horizontal axis represents the azimuthal position of the antenna over a full scan of 360 degrees, and the vertical axis the distance of the target from the radar site in nautical miles (nm). The radar system has a range of about 30 nm. In the projection of the target data of FIG. 3, the course of a target that would show as a straight line on a polar diagram, is represented by a curve similar to a hyperbola. As seen in FIG. 3, most points on the display appear to be correlated with a target track and may be uniquely identified.

Figure 4:
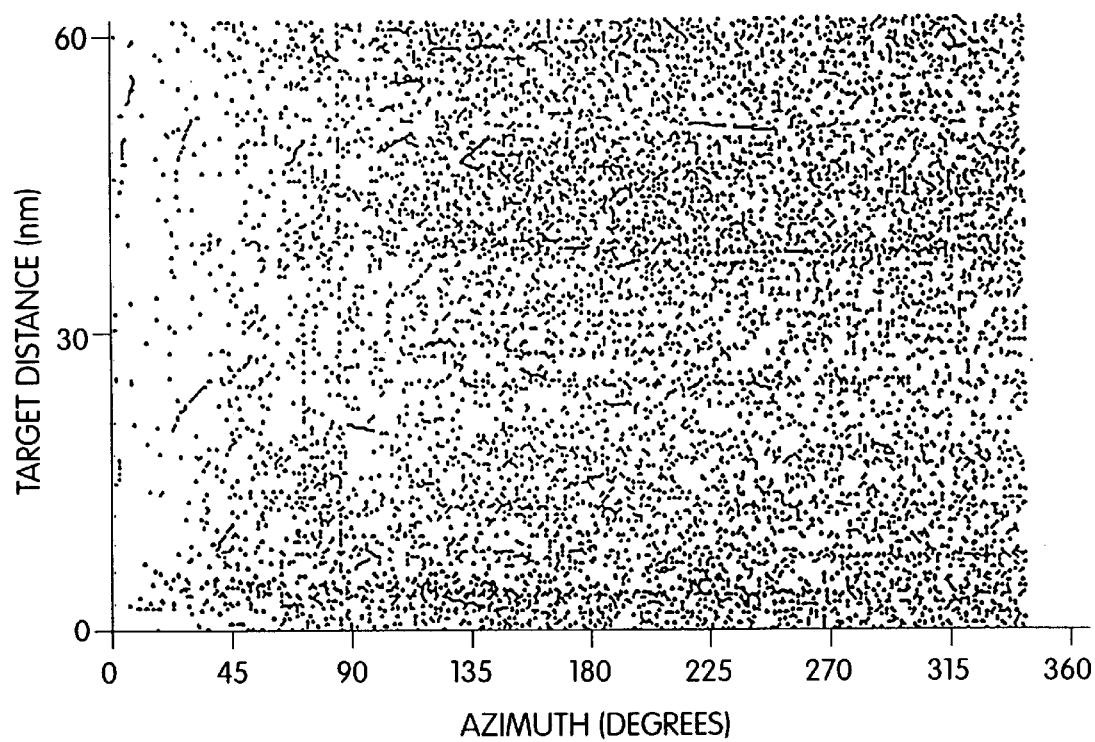
FIG. 4 shows uncorrelated target data of an exemplary primary short range radar system.

Referring now to FIG. 4, target data received by an exemplary primary radar antenna of the Boston Short Range radar system are shown for 94 consecutive scans, with a scan duration of 4.6 seconds, corresponding to a total scan time of 7.2 minutes. The horizontal axis represents the azimuthal position of the antenna over a full scan of 360 degrees, and the vertical axis the distance of the target from the radar site in nautical miles. The exemplary primary radar system has a range of about 60 nm. The distances and azimuth angles are derived from the radar echos received by the primary antenna alone, without the benefit of input from the secondary antenna. The individual data points (blips) include, as mentioned above, not only the radar echo reflected from the targets, but may also include reflections from fixed structures, moving radar reflectors which are not targets, such as birds, and other noise. The noise will depend on the set sensitivity of the system. For example, a radar system able to detect smaller targets, such as single engine planes, will have a higher sensitivity and therefore more noise than a system optimized for the detection of larger airplanes. It is apparent from FIG. 4 that a correlation between the displayed blips and the moving targets and therefore the generation of a target track is difficult, in particular when the targets are bunched or moving fast or changing speed and direction.

It is therefore desirable to employ a process that can correlate quicky and reliably primary target data with targets by eliminating unwanted data points early on in the process. A short search acquisition time is essential to achieve this goal.

As mentioned above, government specifications require on the average, that targets are correlated with tracks within 1 second 95% of the time, counting from the time the radar signal is received by the STARS processor 18 until the time the corresponding data point is correlated with a track and displayed on display 20. Of the total processing time of 1 second, approximately 450 ms are allocated to the actual correlation process performed by processor 18.

Figure 5:
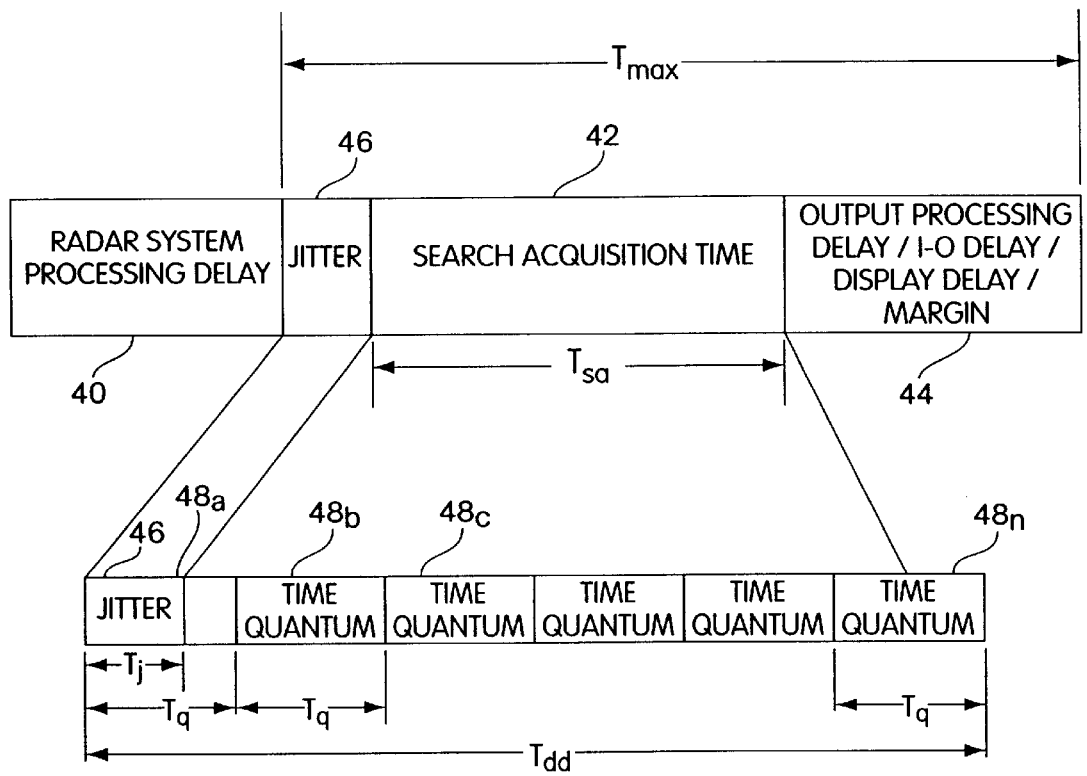
FIG. 5 is a timing diagram of the radar system of FIG. 1.

Referring now to FIG. 5, the maximum time period $T_{max}$ of 1 second allocated for target correlation begins when the target data are received by the processor 18 (FIG. 1) and ends when the targets tracks are displayed. Included in $T_{max}$ are therefore a dwell delay time $T_{dd}$, and an output processing delay time 44, whereas the processing delay 40 due to the equipment of the radar acquisition system 10, 10' and the transmission channels 15, 16 and 17 are excluded. The target data do not arrive at the input of processor 18 in the order they were received by the radar antenna 11, but may suffer a random delay caused by, for example, processing steps performed in processor 14. This random delay is indicated in FIG. 5 as jitter 46 with a time duration $T_j$ of typically 50 ms. The dwell delay time $T_{dd}$ is the sum of the jitter 46 and the search acquisition time ($T_{sa}$) 42. To correlate the target data with a target report and a target track, the STARS processor 18 cycles through the received target data and executes one complete cycle through each time quantum $48_a$, $48_b$, ..., $48_n$. A typical ATC system presently in use operates with a fixed dwell delay time $T_{dd}$ of 450 ms and a time quantum duration of 150 ms. As seen in FIG. 5, the exemplary first time quantum $48_a$ is longer than the duration of the jitter 46 and includes the jitter 46. If the jitter 46 has a longer time duration than the time quantum, then the jitter 46 may occupy two or more time quanta $48_a$, $48_b$, .... The processor 18 may be able to correlate all the target data within two or three time quanta, in which case the dwell delay time $T_{dd}$ may be significantly shorter than the 450 ms allocated in conventional radar systems to perform the correlation process. This will be the case in particular when the targets are at a greater distance from the radar site, as will now be described in detail.

Figure 6:
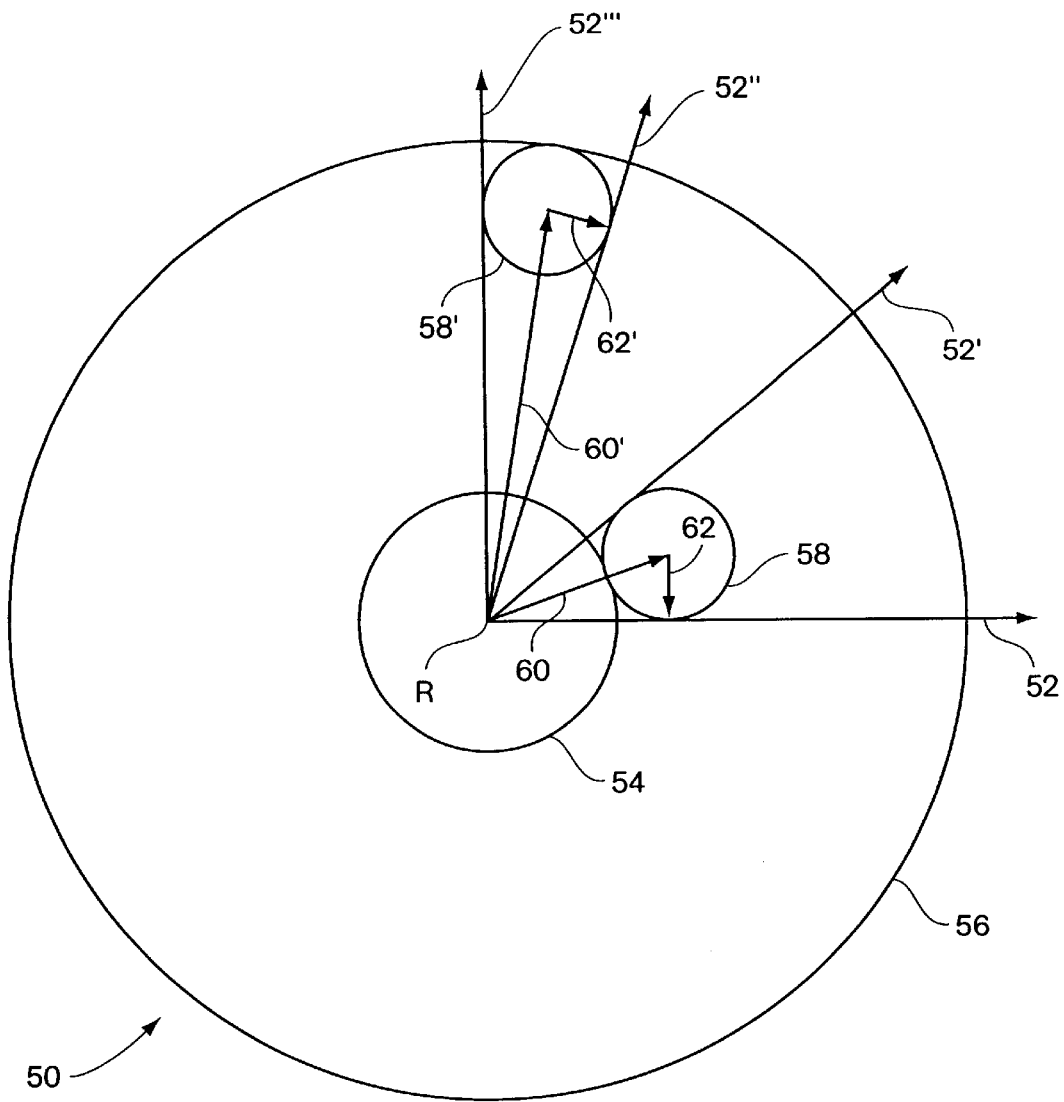
FIG. 6 shows the coverage provided by the radar system of FIG. 1 and corresponding search areas.

Referring now to FIG. 6, a primary radar site R scans a radar beam 52 which at successive time intervals will assume directions 52', 52", 52''' and so on. The radar has a minimum and maximum range depicted by the circles 54 and 56, respectively. The exemplary primary short range antenna discussed with reference to FIGS. 3 and 4 may have the antenna period of 4.6 seconds. During the fixed dwell time 42 of 450 ms, the beam 52 exemplary antenna advances to the beam direction 52' subtending an angle of 32.4 degrees between 52 and 52'. For example, during one complete revolution of the radar antenna 11, a target R located initially at the center of circle 58 at a distance 60 from the radar site may cover a distance 62 from the center of the circle 58. The radius 62 is called "search radius" and depends on a number of characteristics, including the speed and acceleration/deceleration of the target. Only target data points located inside the search area 58 will be examined for correlation with a previous established target data point or target report. One actual search radius 58 of a short range radar producing low noise, high-quality tracks is approximately 1 nautical mile, corresponding to a scan angle of 11.5 degrees subtended between the radar beams 52 and 52' for a target distance 60 of 10 nm. The angle of 11.5 degrees is scanned during approximately 140 ms which approximately is the time duration of a processing quantum presently used in a conventional ATC system. The search radii used in actual radar systems depend slightly on the distance from the radar site to accommodate the distance-dependent beam size and noise. For example, the search radius may be 0.6 nm at a distance of 4 nm, increasing to 1.1 nm at a distance of 60 nm. The scope of the invention is not limited by an actual variation of the search radius with distance.

As seen from FIG. 6, with search radius 62, 62' and corresponding search area 58, 58' that is substantially independent of the distance 60, 60' of the target from the radar site, the angle subtended between the radar beams 52" and 52''' capturing the more distant target is significantly smaller than the angle subtended between the radar beams 52 and 52' for the closer target. Accordingly, the search acquisition time can be reduced for the more distant targets due to the constant angular velocity of the mechanically scanned antenna. For example, for a target having a distance 60' of 60 nm from the radar site and a search radius 62' of 1 nm, the angle between 52" and 52''' is 1.9 degrees, corresponding to a search acquisition time of 24 ms for the exemplary short range radar having an antenna period of 4.6 seconds. As a result, more distant target data and target reports may be correlated within a shorter time than target data originating from closer targets.

Figure 7:
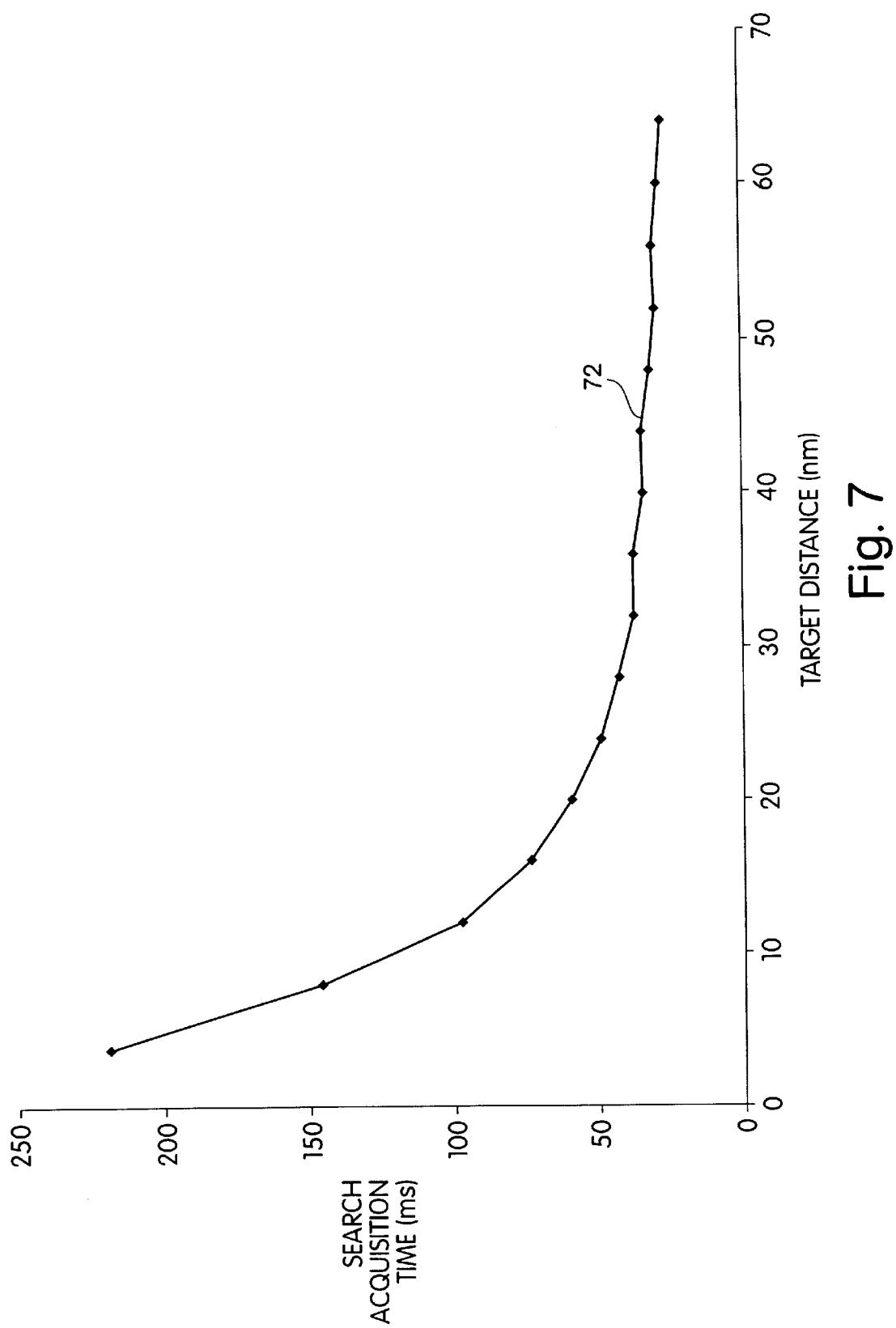
FIG. 7 shows the search acquisition time according to an embodiment of the invention.

FIG. 7 shows a typical search acquisition time expressed in ms for the exemplary short range radar in a circular search area with a radius increasing steadily from 0.6 nm for a target distance of 4 nm to 1.1 nm for a target distance of 60 nm. The search acquisition time $T_{sa}$ is given by the following formula:

$T_{sa}$=antenna_period*arcsin(r/d)π for r<d, and $T_{sa}$=antenna_period/2 for r≥d, wherein r is the search radius 62, 62' and d is the target distance 60, 60'.

TABLE 1

| Target distance in nautical miles | Search acquisition time in ms |
|---|---|
| 4 | 220 |
| 8 | 147 |
| 12 | 97.7 |
| 16 | 73.2 |
| 20 | 58.6 |
| 24 | 48.8 |
| 28 | 41.8 |
| 32 | 36.6 |
| 36 | 36.6 |
| 40 | 32.9 |
| 44 | 33.3 |
| 48 | 30.5 |
| 52 | 28.2 |
| 56 | 28.8 |
| 60 | 26.8 |
| 64 | 25.2 |

The search acquisition times are listed in the right-hand column of Table 1 and illustrated in FIG. 7. As seen from curve 72 of FIG. 7, the search acquisition times are considerably shorter than the presently used processing quantum of 150 ms, except for targets very close to the radar site. It can therefore be expected that shorter processing quanta can significantly reduce the dwell delay time $T_{dd}$ 42 and thereby also the maximum processing time $T_{max}$ of 1 second without degrading the overall performance of the radar system.

As explained above, processing of the radar signal and correlation with target reports and target tracks in the STARS processor 18 is "quantized," meaning that during each process "quantum" the processor 18 cycles through all the data once to establish correlation. The dwell delay time 42 to correlate a particular radar signal with a target report to establish a target track can be determined as the sum of the jitter delay 46 inherent in the transmission of the target data from the radar acquisition system 10 to the processor 18 and the processing time to establish correlation, with the result rounded up to the next quantum. One formula for the dwell delay time $T_{dd}$ measured in ms for a particular target report is:

$T_{dd}$=Ceiling[(search_acqusition_delay+jitter_delay)/quantum_interval+1)]*quantum_interval.  (Eq. 1)

Figure 8:
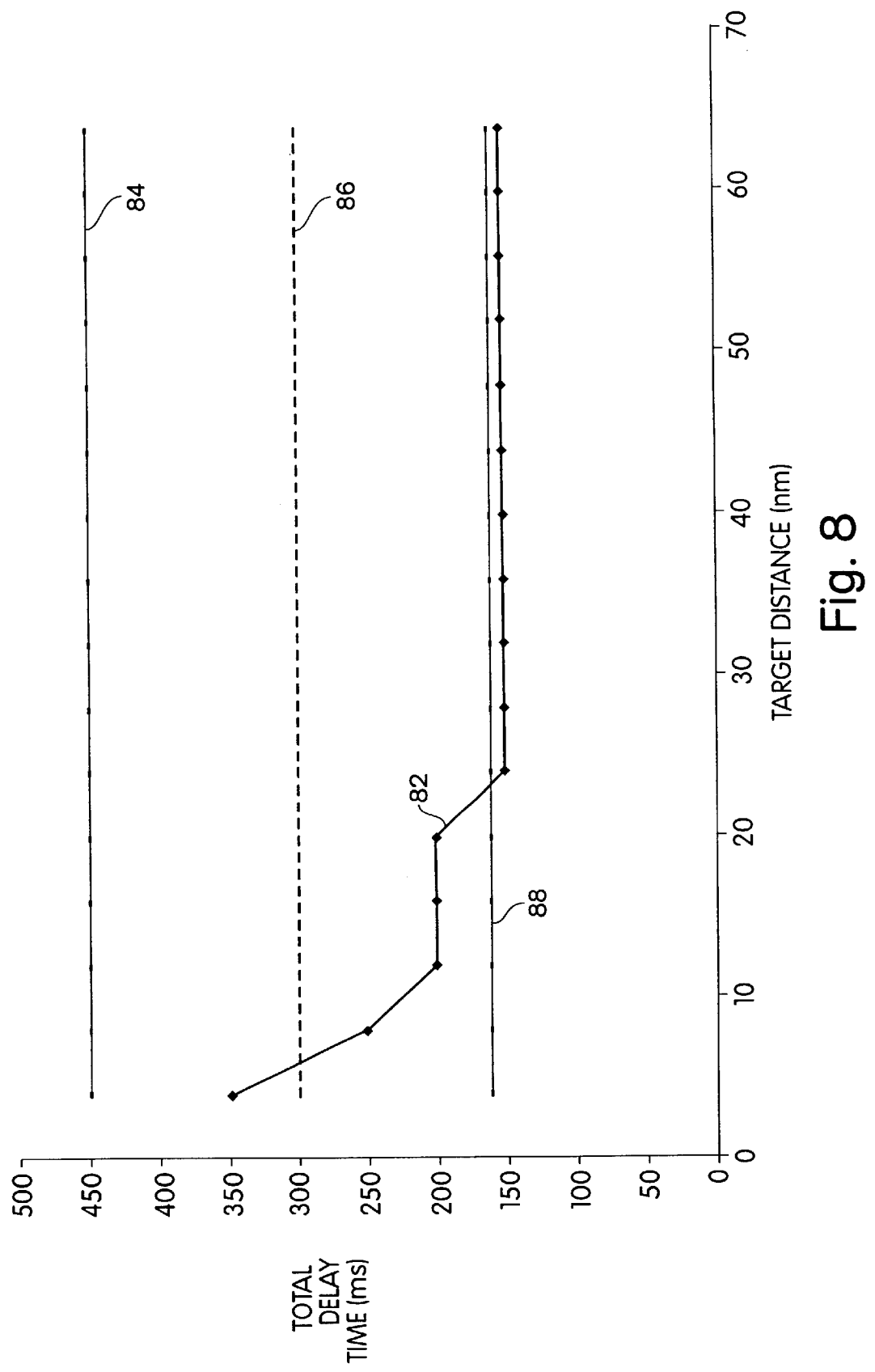
FIGS. 8 and 9 shows the dwell delay time for the short range radar of FIG. 4.

FIG. 8 shows a graphic representation of the total delay time $T_{dd}$ computed with Eq. 1 using the search acquisition times of Table 1 (curve 82). Also shown is the constant total delay time (curve 84) of 450 ms currently allocated for processing in processor 18 to correlate the target data. As evident from FIG. 8, a constant total delay time $T_{dd}$ of 450 ms—or even a shorter total delay time $T_{dd}$ of 300 ms (curve 86)—wastes processing time since most target data points, with the exception of the closest target at a distance of 4 nm, can be processed and correlated with a much shorter total delay time $T_{dd}$ by using the variable search acquisition time of the invention. The average total delay time of the data points of curve 82, as depicted by the horizontal line 88, is 157 ms and therefore shorter than the constant delay time of 450 ms presently in use.

Figure 9:
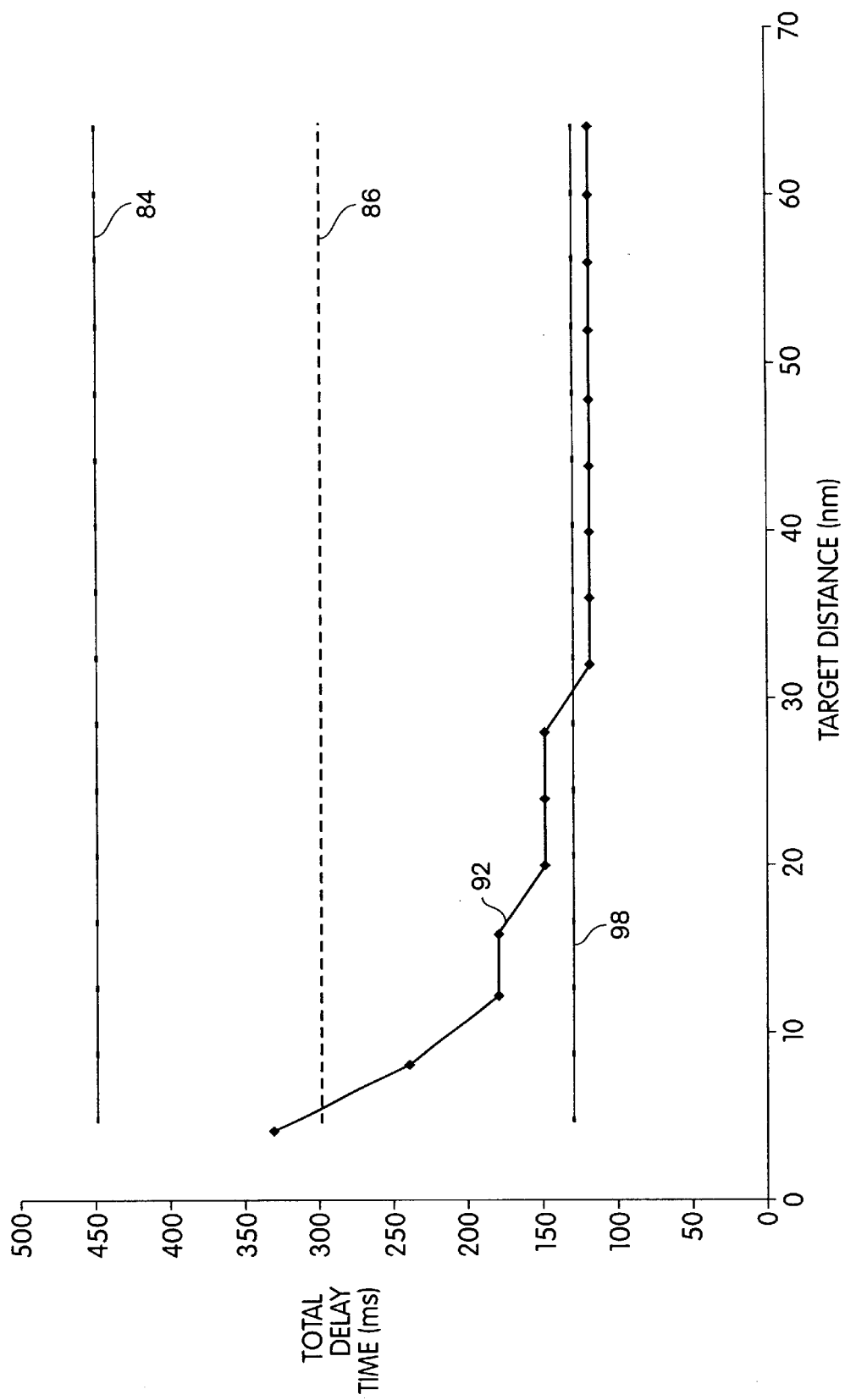

The average total delay time can be further reduced by using quanta of shorter duration which may require faster processors 18 and correlators. Referring now to FIG. 9, a quantum duration of 30 ms is used to compute the total delay time shown as curve 92. The average total delay time is hereby reduced to approximately 130 ms, as depicted by the horizontal line 98. A quantum duration of 100 ms, on the other hand, increases the average total delay time to 212 ms (not shown). In other words, shorter quanta can reduce the average delay time. The major reduction in the total delay time, however, is due to the significantly shortened search acquisition times for the more distant targets listed in Table 1 and shown in FIG. 7. As a result, the longer search acquisition time for targets that do approach near the radar antenna can now be accommodated within the permitted response time allowed for an ATC radar system. As mentioned above, under STARS guidelines, five percent of responses are allowed to exceed one second.

A small number of residual target data that cannot be correlated with a target track, or target tracks that cannot be correlated with target data, may be processed in compliance with the conventional correlation algorithm allowing for a maximum total dwell delay time of 450 ms. Depending on the outcome of the correlation decision, these target data and target tracks can then be either sent to the display and discarded from the wait queue, or discarded from the wait queue without being sent to the display, as described below.

In an embodiment of the invention for the STARS program, the system disclosed herein can reduce the average dwell time by approximately 250–300 ms out of 450 ms. The system can also reduce the frequency of correlation errors for targets that are close to a primary radar antenna by accommodating the longer dwell delay times for closer targets within the limits of the maximum statistically permissible overall dwell delay.

Figure 10:
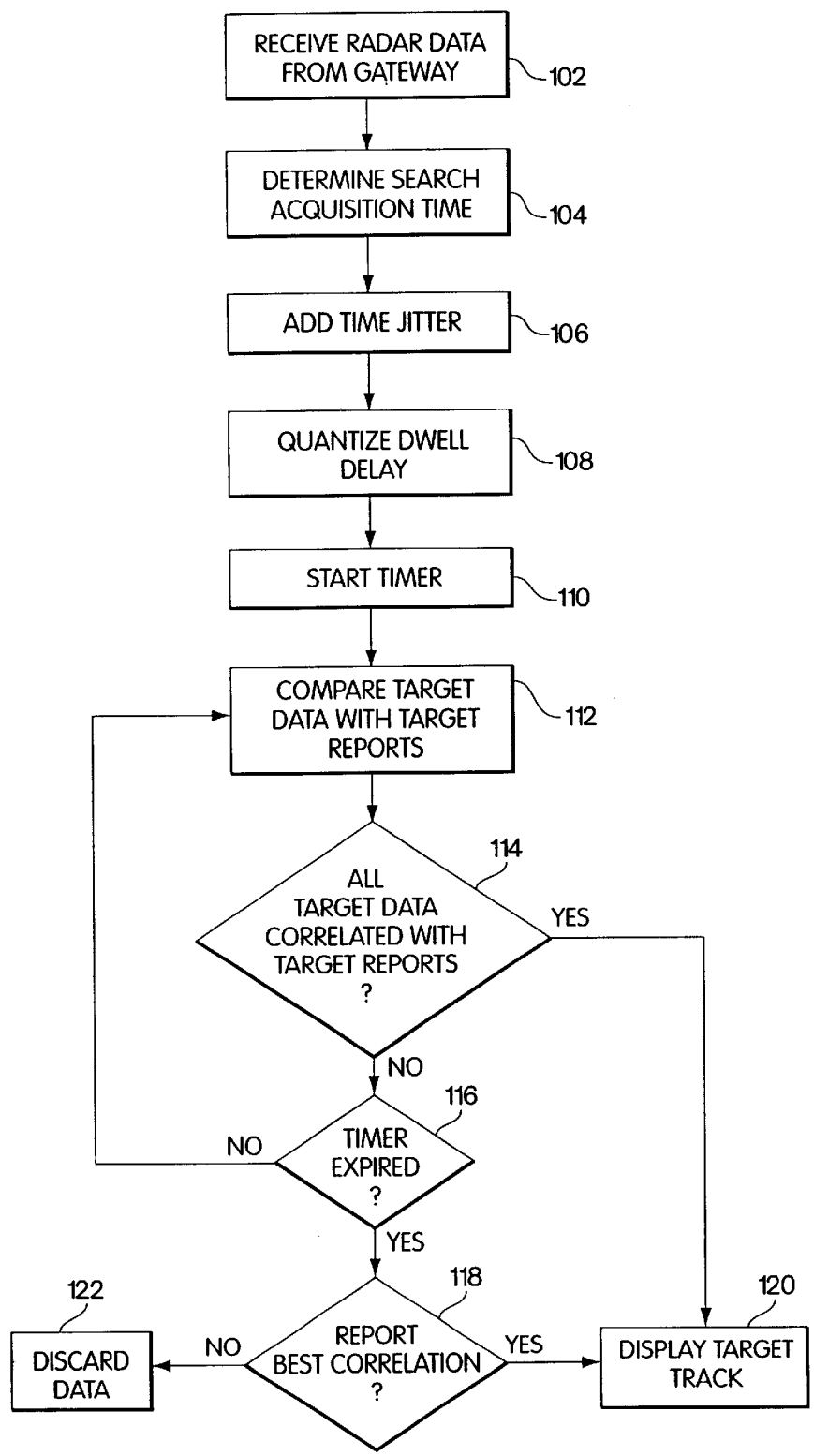
FIG. 10 is a process flow chart for correlating target data.

Referring to FIG. 10, a process flow chart 100 depicts processing steps by which the processor 18 may take advantage of the variable dwell time disclosed herein. The processor 18 receives target data from the gateway 16 via the communications link 17, step 102. The target data may be in digital form and include a header and coordinate information about the target, such as the target's distance d from the radar site and the azimuthal angle $\Theta$. Based on the target's distance, processor 18 determines, for example from Table 1, the search acquisition time associated with the particular target data, step 104. Next, the processor accounts for the time jitter introduced by the radar processor 14 and the buffer 16, step 106. The jitter may be determined experimentally, with the corresponding value periodically updated and stored in a memory located, for example, in the processor 18 (not shown). A set processing quantum determines a fixed cycle time (time quantum) during which the processor 18 attempts to correlate the target data received from the gateway 16 with target reports to establish or continue a target track, step 108. The processing time quantum may be a constant depending on the processing capabilities of the processor 18. Next, at a step 110, a timer is started which counts by process quanta and runs until target data and target reports have been correlated. The process compares the target data with target reports, step 112. Target data of targets distant from the radar site and having a short search acquisition time can be correlated more quickly, for example within one or two time quanta, step 114, and the correlated target data are sent to the display and/or transmitted or stored for further processing, step 120. For target data that are not correlated with radar reports, the process goes to step 116 to check if the timer has expired, i.e., if the timer has reached the maximum permitted dwell delay time of 450 ms. If the timer has not expired, the process returns to step 112 to attempt further correlation. Otherwise, a decision is made based on conventional data correlation algorithms to check, if any data that could not be properly correlated have a probability of being correlated based on a predetermined threshold value, step 118. If correlation is satisfactory, these data are assigned to a corresponding target report and target track and send to the display 20 and/or transmitted or stored for further processing, step 120. Otherwise, such poorly correlated or un-correlated data are discarded, step 122. It should be understood that these processing steps represent one embodiment of steps for implementing variable dwell time processing, and other methods and systems are encompassed within the scope of the invention.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can advantageously be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

While the invention has been disclosed in connection with the preferred embodiments shown and described in detail, various modifications and improvements thereon will become readily apparent to those skilled in the art. Accordingly, the spirit and scope of the present invention is to be limited only by the following claims.

I claim:

1. A radar system comprising:

an antenna acquiring radar signals from a target, said radar signals providing target data representing spatial coordinates of the target, and a processor producing a target report corresponding to the target by correlating with the target during a search acquisition time one of the target data having coordinates within a predetermined range of the target, wherein the search acquisition time for the target data having coordinates within the predetermined range is adjusted depending on the distance of the target from the radar site.

2. The radar system of claim 1, further comprising output means for correlating the target report with a target track.

3. The radar system of claim 1, wherein the antenna has a rotation period and a beam width defining antenna operating parameters, said antenna operating parameters at least partially defining the search acquisition time.

4. The radar system of claim 1, wherein the search acquisition time is shorter for targets that are more distant from the antenna than for targets that are closer to the antenna.

5. The radar system of claim 1, wherein the search acquisition time is at least in part determined by at least one of the velocity, acceleration and maneuvers of the target.

6. The radar system of claim 1, comprising at least one additional antenna providing additional target data, wherein said additional target data are supplied to and processed by the processor.

7. In a radar system, a processor for correlating target data with a target track comprising:

input means obtaining target data of radar target, said target data having spatial coordinates, processing means producing within a processing time period a target report corresponding to the target by correlating with the target one of the target data having coordinates within a predetermined range of the target, output means providing displayable signals associated with the target report, wherein said processing time period is determined according to at least one of the spatial coordinates of the target.

8. The processor of claim 7, wherein the displayable signals are displayed on a display monitor as a target track, wherein the target track represents a sequence of target reports that have a high probability of being correlated.

9. The processor of claim 7, wherein the displayable signals are stored in a memory.

10. The processor of claim 7, wherein the target data received by the input means comprise the target data from at least one primary antenna and at least one secondary antenna, and wherein at least one of the target report and the target track is formed from an identification code of the secondary antenna, if the identification code of the secondary antenna is intelligible, and from the target data of the primary antenna and at least a portion of the target data of the secondary antenna, if the identification code of the secondary antenna is garbled.

11. A method of radar tracking of a target having a distance from a radar site, the method comprising:

providing a radar acquisition system with at least one antenna, the system producing target data from at least the target, said target data having coordinates, determining a search acquisition time based on at least one of the coordinates of the target and a search range, and correlating during said search acquisition time target data obtained during successive scans of the antenna and located within the search range to form a target track.

12. The method of claim 11, wherein correlating target data includes executing a correlation process during a quantized time period, and repeating the correlation process for subsequent quantized time periods until the target data are correlated or a predetermined timer has expired.

13. The method of claim 11, wherein correlating target data includes assigning a probability for the target data of being representative of the target based on a motion characteristics of the target.

14. The method of claim 11, wherein the motion characteristics includes at least one of velocity, acceleration and direction of movement of the target.

15. The method of claim 11, wherein the predetermined range of the target is substantially independent of the distance of the target from the radar site.

16. The method of claim 11, wherein the search acquisition time is shorter for targets that are more distant from the radar site.

17. The method of claim 11, wherein the search acquisition time depends on motion parameters of the target.

18. The method of claim 17, wherein the motion parameters comprise at least one of a direction of travel, a velocity and an acceleration of the target.

19. A computer program, residing on a computer-readable medium, comprising instructions for causing a computer to:

accept radar target data representing spatial coordinates of a target and acquired during successive scans of a radar antenna;

select form a subsequent scan target data having coordinates within a predetermined range of the spatial coordinates of the target determined during a previous scan;

compute a search acquisition time based on the predetermined range; and correlate during the search acquisition time the target data with a target track, wherein the search acquisition time is shorter for targets that are more distant from the radar antenna than for targets that are closer to the radar antenna.

20. The computer program of claim 19, wherein correlating comprises executing a correlation routine during a dwell delay time comprising the search acquisition time and a jitter, wherein the dwell delay time is subdivided into time quanta having a predetermined time duration.

* * * * *